UNITED STATES PATENT OFFICE.

CARL CHRISTIAN LEOPOLD GETHER BUDDE, OF COPENHAGEN, DENMARK.

PROCESS OF STERILIZING FOODS OR ORGANIC COMPOUNDS.

No. 877,703.

Specification of Letters Patent.

Patented Jan. 28, 1908.

Application filed June 22, 1906. Serial No. 322,864.

*To all whom it may concern:*

Be it known that I, CARL C. L. G. BUDDE, a subject of the King of Denmark, residing at Copenhagen, Denmark, have invented certain new and useful Improvements in Processes of Sterilizing Foods or Organic Compounds, of which the following is a full, clear, and exact description.

In sterilizing perishable goods it is often desirable to avoid intense heating. Milk, for instance, can only bear slight heating if it is to retain its valuable qualities. An addition of a preservative cannot, in most cases, be employed and especially not when the perishable goods are to be used as food, because the preservative might be dangerous to health.

It is true, as seen for instance from the U. S. A. Patent No. 779637, that sterilization may be effected by means of hydric peroxid under such conditions, that the substances finally become free of hydric peroxid. A heating to about 50—55° C. cannot be avoided here, and it is sometimes desirable to avoid even this slight heating.

The present invention consists in adding a substance, possessing bactericidal qualities and easy to neutralize by means of hydric peroxid. Hydroxylamin and hydrazin are excellently adapted for this purpose. Numerous experiments have shown, that hydroxylamin, even in a much diluted condition, is transformed into nitrogen and water by means of hydric peroxid according to the following formula:

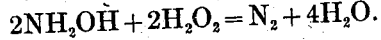

$$2NH_2OH + 2H_2O_2 = N_2 + 4H_2O.$$

A surplus of hydric peroxid must be added, this surplus, however, is decomposed by the organic substance present. Hydrazin may also be used for this purpose.

As is well known, the combined bactericide effect of two antiseptics acting simultaneously is far greater than the sum of the individual effect of the two substances. By using the present method the following advantages are obtained:

1. That only very small amounts of both antiseptics are needed, in order to produce a very high degree of bactericide effect.

2. That the temperature may be chosen at will. If the duration of the process is no factor or if the goods to be sterilized are very sensitive to a raising of the temperature, the process may be carried out at ordinary temperature; if, however, the process is to be forced as much as possible, and if the qualities of the goods to be sterilized are not much influenced by heat, the temperature may be raised accordingly.

3. That the sterilized goods after the process is terminated and, though the above named advantages have been obtained, are still free of foreign substances, as both added antiseptics have been completely neutralized.

In order to sterilize—for example—milk according to this method, about 0.07 to 0.08% hydroxylamin is added to the milk. After stirring or shaking, about 0.025% hydric peroxid is added. After the milk has been standing for some hours at ordinary temperature, the milk is free of hydroxylamin and hydric peroxid. If milk capable of keeping for an unlimited time is to be produced according to this method, heating for example to 50°—55° C. must subsequently be used, as the enzymes will not be disturbed by the process and they would gradually cause a slow spontaneous decomposition and transformation of the substances of the milk, if their activity is not disturbed by subsequently heating. It is obvious, that this heating need to last very short time only.

With suitable modification, the method may be used for most kinds of perishable goods.

Having thus described my invention, I claim as new and desire to secure by Letters Patent:

1. The process of sterilizing organic substances, by first mixing the substance with a nitrogen compound having the chemical properties of hydroxylamin, and then adding hydric peroxid.

2. The process of sterilizing organic substances, by first mixing the substance with hydrazin and then adding hydric peroxid.

In witness whereof, I subscribe my signature, in the presence of two witnesss.

CARL CHRISTIAN LEOPOLD GETHER BUDDE.

Witnesses:
 DONALD SMITH,
 RICHARD RYTHIN.